United States Patent
McFarland, Jr.

(10) Patent No.: US 11,642,257 B2
(45) Date of Patent: May 9, 2023

(54) MAPPING AND DATA COLLECTION OF IN-BUILDING LAYOUT VIA MOBILITY DEVICES

(71) Applicant: Toyota Motor North America, Inc., Plano, TX (US)

(72) Inventor: Stephen Paul McFarland, Jr., Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 650 days.

(21) Appl. No.: 16/749,222

(22) Filed: Jan. 22, 2020

(65) Prior Publication Data
US 2021/0220197 A1 Jul. 22, 2021

(51) Int. Cl.
*A61G 1/00* (2006.01)
*A61G 5/10* (2006.01)
*G01C 21/20* (2006.01)
*G05D 1/00* (2006.01)
*G06V 20/10* (2022.01)

(52) U.S. Cl.
CPC .......... *A61G 5/1051* (2016.11); *G01C 21/206* (2013.01); *G05D 1/0088* (2013.01); *G06V 20/10* (2022.01)

(58) Field of Classification Search
CPC ........ A61G 5/1051; A61G 5/10; A61G 5/042; A61G 2203/16; A61G 2203/22; A61G 2203/30; G01C 21/206; G01C 21/005; G01C 21/3807; G01C 21/3833; G05D 1/0088; G05D 2201/0206; G05D 1/0248; G05D 1/0274; G06V 20/10

USPC .......................................................... 382/104
See application file for complete search history.

(56) References Cited

U.S. PATENT DOCUMENTS

| | | | |
|---|---|---|---|
| 9,980,246 B2* | 5/2018 | Pattabiraman | H04W 4/021 |
| 10,022,867 B2* | 7/2018 | Saboo | B25J 9/1661 |
| 10,719,983 B2* | 7/2020 | Levy | G01C 5/06 |
| 11,237,546 B2* | 2/2022 | Cella | G06V 10/82 |
| 11,325,250 B2* | 5/2022 | Deyle | B25J 13/089 |
| 2008/0280265 A1* | 11/2008 | Lopez-Jaime | G09B 21/003 434/112 |
| 2012/0143495 A1* | 6/2012 | Dantu | G01C 21/206 455/457 |

(Continued)

FOREIGN PATENT DOCUMENTS

| | | | | |
|---|---|---|---|---|
| CA | 2983540 C | * | 3/2018 | ........... G01C 21/206 |
| CN | 108931977 A | | 12/2018 | |

(Continued)

OTHER PUBLICATIONS

Kalaya, Sithisone et al., "Mobile robots exploration and mapping in 2D", ASEE 2014 Zone I Conference, Apr. 3-5, 2014, p. 1-6, University of Bridgeport, Bridgeport, CT.

(Continued)

*Primary Examiner* — Mahendra R Patel
(74) *Attorney, Agent, or Firm* — Dinsmore & Shohl LLP (57) ABSTRACT

A method includes receiving sensor data relating to an environment from a plurality of mobility deices, determining locations of one or more points of accessibility within the environment based on the sensor data, creating an environment map based on the sensor data, and transmitting the environment map to a mobility device. The environment map includes the one or more points of accessibility.

16 Claims, 4 Drawing Sheets

(56) References Cited

U.S. PATENT DOCUMENTS

| | | | | |
|---|---|---|---|---|
| 2015/0193971 A1* | 7/2015 | Dryanovski | ............ | G06T 17/05 |
| | | | | 345/419 |
| 2016/0070265 A1* | 3/2016 | Liu | ...................... | B64C 39/024 |
| | | | | 701/25 |
| 2017/0251338 A1* | 8/2017 | Huberman | .............. | H04W 4/33 |
| 2018/0067593 A1* | 3/2018 | Tiwari | .................. | G08B 13/22 |
| 2018/0120793 A1* | 5/2018 | Tiwari | .................. | G06Q 10/06 |
| 2018/0246524 A1* | 8/2018 | Hillen | .................... | B25J 9/1664 |
| 2018/0364052 A1* | 12/2018 | Hackert | .................. | A47L 9/009 |
| 2019/0017835 A1* | 1/2019 | Pickover | ................ | G06N 5/003 |
| 2019/0084161 A1* | 3/2019 | Tokuhashi | ............. | B25J 9/0084 |
| 2020/0072613 A1* | 3/2020 | Kuzmanovic | ......... | B64C 39/024 |

FOREIGN PATENT DOCUMENTS

| | | | | | |
|---|---|---|---|---|---|
| DE | 102016121320 A1 | | 5/2018 | | |
| EP | 3246725 A1 | * | 11/2017 | ........... | G01S 5/0045 |
| WO | WO-2014016602 A1 | * | 1/2014 | ........... | G01C 21/206 |
| WO | WO-2018211261 A1 | * | 11/2018 | ................ | A61G 5/04 |
| WO | WO-2020073003 A1 | * | 4/2020 | ................ | B60L 58/13 |

OTHER PUBLICATIONS

Fox, Dieter et al., "Distributed multi-robot exploration and mapping", Proceedings of the IEEE, Jul. 2006, p. 1-12, vol. 94, Issue 7.

* cited by examiner

MAPPING AND DATA COLLECTION OF IN-BUILDING LAYOUT VIA MOBILITY DEVICES

TECHNICAL FIELD

Embodiments described herein generally relate to mobility devices and, more specifically, to mapping and data collection of in-building layout via mobility devices.

BACKGROUND

Mobility devices, such as wheelchairs, enable a user to move from one location to another location while the user is seated in the mobility device. Accordingly, mobility devices may be utilized when walking is difficult or impossible for a user due to, for example, illness, injury, or disability.

Some mobility devices are operated by the user either manually or with one or more input devices, such as buttons, switches, levers, and/or graphical user interfaces that enable a user to control the operation of the wheelchair. Other mobility devices may operate autonomously. Autonomous mobility devices typically have one or more sensors to allow such devices to detect their environment and traverse therethrough.

In addition to the one or more sensors, it may be desirable for autonomous mobility devices to have access to an environment map of the environment through which they are traversing. In particular, it may be desirable to have an environment map that includes the locations of points of accessibility, such as ramps or elevators, within the environment. Such points of accessibility may be useful for autonomous vehicles effectively traversing through an environment.

However, environment maps of interior spaces of buildings are often not available. To the extent that such maps exist, they often do not include locations of points of accessibility. Accordingly, there is a need for systems to create environment maps including points of accessibility that can be used by mobility devices to traverse interior spaces.

SUMMARY

In one embodiment, a method includes receiving sensor data relating to an environment from a plurality of mobility devices, determining locations of one or more points of accessibility within the environment based on the sensor data, creating an environment map based on the sensor data, and transmitting the environment map to a mobility device. The environment map includes the one or more points of accessibility.

In another embodiment, a map server includes a transceiver, a processing device, and a non-transitory, processor storage medium in communication with the processing device. The transceiver receives sensor data relating to an environment from a plurality of mobility devices. The non-transitory, processor-readable storage medium includes one or more programming instructions that, when executed, cause the processing device to determine locations of one or more points of accessibility within the environment based on the sensor data and create an environment map of the environment based on the sensor data. The environment map comprises locations of one or more points of accessibility within the environment.

In another embodiment, an autonomously driven mobility device includes one or more sensors, a transceiver, a data storage device, a navigation unit, a processing device, and a non-transitory, processor-readable storage medium in communication with the processing device. The sensors collect sensor data about an environment. The transceiver transmits the sensor data to a map server and receives an environment map of the environment map from the server. The data storage device stores an environment map of the environment including locations of one or more points of accessibility within the environment. The navigation unit determines a navigation route between a current position of the mobility device and a selected destination in the environment based on the environment map. The non-transitory, processor-readable storage medium includes one or more programming instructions that, when executed, cause the processing device to cause the mobility device to move towards the selected destination along the navigation route.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments of the present disclosure generally relate to systems for using mobility devices to create environment maps of interior spaces including points of accessibility. Such maps can then be used by autonomous mobility devices to traverse through environments described by such environment maps.

As one or more mobility devices having one or more sensors traverse through an environment, the sensors on the mobility devices may record sensor data relating to the environment. This sensor data may then be transmitted by the mobility devices to a map server. The map server may use this sensor data to create an environment map of the environment. As additional mobility devices traverse through the environment and collect additional sensor data, this sensor data is also transmitted to the map server, which may update the environment map based on this additional sensor data. Over time, as increasing amounts of sensor data is received by the map server, the map server may continually refine the environment map, thereby increasing its accuracy. In particular, the environment map created by the map server may contain the locations of points of accessibility within the environment, which can be particularly useful to mobility devices.

Once the map server creates an environment map of a particular environment, whenever an autonomous mobility device enters the environment, the autonomous mobility device may download the environment map and use the environment map to navigate through the environment.

As used herein, the term "communicatively coupled" may mean that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
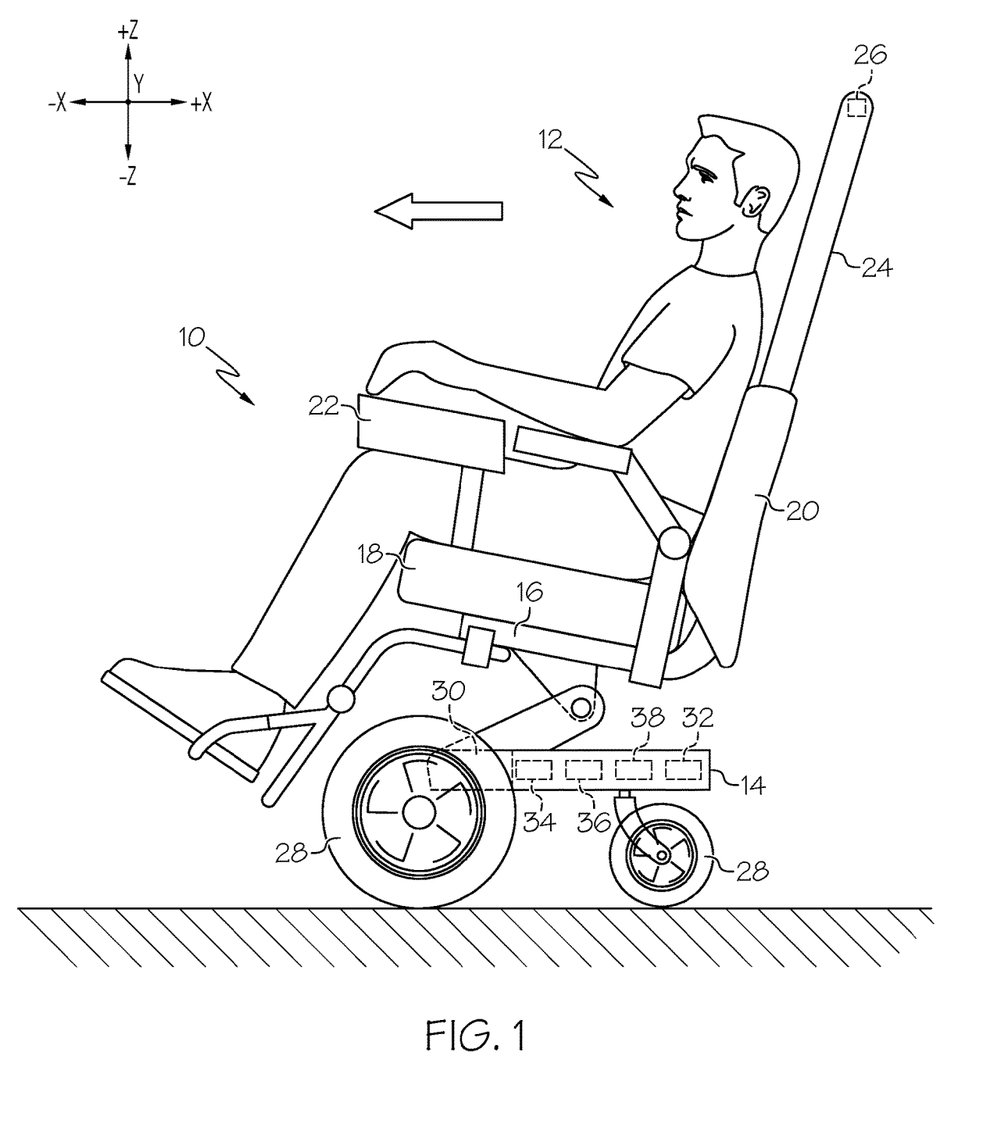
FIG. 1 schematically depicts an illustrative mobility device according to one or more embodiments shown or described herein.

Referring to FIG. 1, a schematic depiction of a mobility device 10 (i.e., a wheelchair) is provided. The wheelchair 10 is a generally recognized wheelchair and, in some embodiments, may be a powered wheelchair that includes motorized components that allow a user 12 to electronically control movement of the wheelchair. In some embodiments, the wheelchair 10 may be an autonomously controlled wheelchair, wherein movement of the wheelchair is controlled without direct control by the user 12. Various components of the wheelchair 10 should be understood and are not described in further detail herein. In some embodiments, the wheelchair 10 may include a power base portion 14, a frame 16, a seat portion 18 and a back portion 20 supported by the frame 16, which in turn is supported by the power base portion 14. Thus, the frame 16 is generally positioned below the seat portion 18 in a system vertical direction (i.e., positioned in the −Z direction of the coordinate axes of FIG. 1 relative to the seat portion 18) and the power base portion 14 is generally positioned below the frame 16 in a vertical direction (i.e., positioned in the −Z direction of the coordinate axes of FIG. 1 relative to the frame 16). In some embodiments, the power base portion 14 may raise, tilt, or otherwise move the frame 16 and subsequently the seat portion 18. The frame 16, the seat portion 18, and the back portion 20 are generally configured to support a user 12 when the user 12 is seated in the wheelchair 10.

In embodiments, a touch screen 22 is coupled to the wheelchair 10. The touch screen 22 may be utilized by the user 12 as an input device to the wheelchair 10. The touch screen 22 may be used to input instructions to the wheelchair 10, such as movement instructions. In some embodiments, the user 12 may utilize the touch screen 22 to input a desired destination and the wheelchair 10 may autonomously move to that location, as explained in further detail below. Accordingly, the touch screen 22 may be communicatively coupled to the base portion 14, including various components thereof, to transmit signals to the power base portion 14 to cause the wheelchair 10 to respond according to the inputs received by the touch screen 22.

In some embodiments, the touch screen 22 may be coupled to other portions of the wheelchair 10 than those shown in FIG. 1. In some embodiments, the wheelchair 10 may not have the touch screen 22, and instead the wheelchair 10 may have one or more other input devices such as a joystick-type controller, buttons, switches, voice controls, breath controls, and/or the like to receive inputs from a user 12.

In embodiments, an arm 24 may extend from the back portion 20. An upper portion of the arm 24 may contain one or more sensors 26. The arm 24 may extend above the height of the user 12 when the user 12 is seated in the wheelchair 10 such that the sensors 26 have an unobstructed view of the area surrounding the wheelchair. In some embodiments, additional sensors may be placed at other locations on the wheelchair 10, such as on the base portion 14.

The sensors 26 may capture environment data around the wheelchair 10 as the wheelchair moves through an environment. The sensors 26 may comprise one or more cameras, radar devices, LIDAR devices, and/or other sensing mechanisms. The sensors 26 may capture environment data that can be used to construct an environment map as the wheelchair 10 moves through an environment, as described in further detail below.

The environment data captured by the sensors 26 may include dimensions of rooms and hallways, the presence and location of moveable and non-moveable objects, and the presence and location of points of accessibility, among other features. As used herein, points of accessibility are structures that allow mobility devices to enter and/or leave buildings or to enter and/or leave certain areas within buildings, such as structures for traversing up to higher-level floors or down to lower-level floors. Examples of points of accessibility may include elevators or ramps. Many environments are either not accessible or have limited points of accessibility and determining locations of these points of accessibility may be important for mobility devices to traverse such environments.

The power base portion 14 may include, but is not limited to, a plurality of wheels 28, a motor 30, a battery 32, a master controller 34, a navigation unit 36, and a transceiver 38. The master controller 34 may be an electronic control unit and may generally be a control device that controls the wheelchair 10 and/or one or more components thereof. As such, the master controller 34 may be communicatively coupled to the various components of the wheelchair 10 such that one or more control signals can be transmitted from the master controller 34 to the various components as described in greater detail herein. The master controller 34 may also receive signals from the various components of the wheelchair 10 such as the sensors 26 and the navigation unit 36.

The transceiver 38 can transmit and receive data to and from a map server, as described in further detail below. The motor 30 may be coupled to the wheels 28 to drive movement of the wheels 28. The battery 32 may generally provide electrical power to the various components of the wheelchair 10. Other components of the power base portion 14 should generally be understood and are not described in further detail herein.

The master controller 34 may generally be a standalone control device that contains one or more components for controlling movement of the wheelchair 10. It should be appreciated that while the master controller 34 is shown in FIG. 1 as part of the wheelchair 10, this is a non-limiting example. That is, the master controller 34 may be a device that is separate from the wheelchair 10, such as, for example, a user carried computing device, the user's mobile device, or the like.

Figure 2:
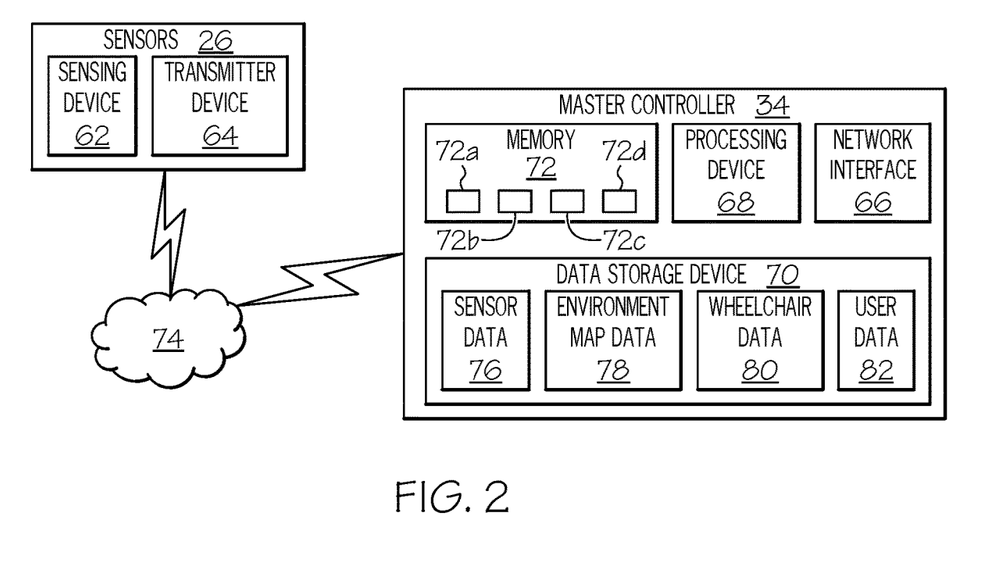
FIG. 2 schematically depicts a block diagram of illustrative components of the mobility device of FIG. 1 according to one or more embodiments shown or described herein.

Now referring to FIG. 2 in which various illustrative internal components of the master controller 34 and internal components of the sensors 26 are schematically depicted. More specifically, the master controller 34 may be communicatively coupled to the sensors 26. In some embodiments, the master controller 34 may be communicatively coupled to the sensors 26 via a network 74. The network 74 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connect the master controller 34 and the sensors 26 together.

In various embodiments, the sensors 26 may include, but is not limited to, one or more sensing devices 62 and a transmitter device 64. The one or more sensing devices 62 may collect sensor data relating to the environment around the wheelchair 10 as the wheelchair moves through an environment. The transmitter device 64 may transmit the sensor data collected by the sensing device 62 to the master controller 34.

In various embodiments, the master controller 34 includes a network interface 66, a processing device 68, a data storage device 70, and a memory component 72. The processing device 68, such as a computer processing unit (CPU), may be the central processing unit of the master controller 34, performing calculations and logic operations to execute a program. The processing device 68, alone or in conjunction with the other components, is an illustrative processing device, computing device, processor, or combination thereof. The processing device 68 may include any processing component configured to receive and execute instructions (such as from the memory component 72).

In some embodiments, the memory component 72 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 72 may be a non-transitory, processor-readable memory. The memory component 72 may include one or more programming instructions thereon that, when executed by the processing device 68, cause the processing device 68 to complete various processes, such as one or more of the processes described herein with respect to FIG. 5.

Still referring to FIG. 2, the programming instructions stored on the memory component 72 may be embodied as one or more software logic modules, where each logic module provides programming instructions for completing one or more tasks, as described in greater detail below. For instance, a wheelchair movement logic module 72a may include a plurality of different pieces of logic, each of which may be embodied as a computer program, firmware, and/or software/hardware, which may be executable by the processing device 68 to cause the wheelchair 10 to move.

An object recognition logic module 72b may include a plurality of different pieces of logic, each of which may be embodied as a computer program, firmware, and/or software/hardware, which may be executable by the processing device 68 to recognize the presence and locations of objects within an environment. In some embodiments, the object recognition logic module 72b comprises one or more image recognition and/or machine learning algorithms. In some embodiments, the object recognition logic module 72b may determine whether detected objects are moveable or non-moveable.

A dimension determination logic module 72c may include a plurality of different pieces of logic, each of which may be embodied as a computer program, firmware, and/or software/hardware, which may be executable by the processing device 68 to determine the dimensions of rooms, hallways, and other spaces within an environment. In some embodiments, the dimension determination logic module 72c comprises one or more image recognition and/or machine learning algorithms.

An accessibility point recognition logic module 72d may include a plurality of different pieces of logic, each of which may be embodied as a computer program, firmware, and/or software/hardware, which may be executable by the processing device 68 to recognize the presence and locations of points of accessibility within an environment. In some embodiments, the accessibility point recognition logic module 72d comprises one or more image recognition and/or machine learning algorithms configured to recognize an accessibility point based on comparison of sensor data, such as images, of an environment with existing images or machine learning data of existing accessibility points.

In one example, a machine learning model may be trained using images of points of accessibility and other images that are not points of accessibility to train the model to recognize points of accessibility. Once the machine learning model is trained, the accessibility point recognition logic module 72d may use the trained machine learning model to detect points of accessibility. In another example, image recognition software may be programmed to recognize various points of accessibility. The accessibility point recognition logic module 72d may use the image recognition software to detect points of accessibility.

The network interface 66 of the master controller 34 may include any wired or wireless networking hardware, such as a modem, LAN port, wireless fidelity (Wi-Fi) card, WiMax card, mobile communications hardware, and/or other hardware for communicating with other networks and/or devices. Therefore, the communication between the master controller 34, the wheelchair 10, and/or the sensors 26 may be provided through the network interface 66. In one example, the master controller 34 may wirelessly communicate with the sensors 26 and the wheelchair 10. It should be appreciated that the user input, as discussed in greater detail herein, may be transmitted to the master controller 34 through the network interface 66.

The data storage device 70, which may generally be a storage medium, may contain one or more data repositories for storing data that is received and/or generated, and may be any physical storage medium, including, but not limited to, a hard disk drive (HDD), memory, removable storage, and/or the like. While the data storage device 70 is depicted as a local device, it should be understood that the data storage device 70 may be a remote storage device, such as, for example, a server computing device or the like. Illustrative data that may be contained within the data storage device 70 is described below and includes, but is not limited to, sensor data 76, environment map data 78, wheelchair data 80, and user data 82 generated by the user 12.

The sensor data 76 may be data captured by the sensors 26. The environment map data 78 may be data related to an environment map of an environment in which the wheelchair 10 is present. The wheelchair data 80 may be data related to the location of the wheelchair, orientation or position of the wheelchair, the type of wheelchair, and the like. The user data 82 may be data related to input provided by the user 12, such as a desired destination of the wheelchair 10.

Still referring to FIGS. 1 and 2, the master controller 34 may use data stored on the data storage device 70 to coordinate movement of the wheelchair 10, as discussed in greater detail herein.

Still referring to FIGS. 1 and 2, it should be appreciated that the master controller 34 may receive new and/or updated instructions or configurations as needed. It should also be appreciated that the sensors 26 may also receive updates and/or new user initiated programs from time to time. These updates may be based on the user 12 and/or the type of wheelchair 10. Moreover, the user 12 or a remote third party may use an application installed on a smart device, tablet, wearable, or a computer that communicates with the master controller 34 so to select the user initiated program or to provide a manual control of the wheelchair 10 to facilitate movement, update the master controller 34, and/or further program the master controller 34.

Figure 3:
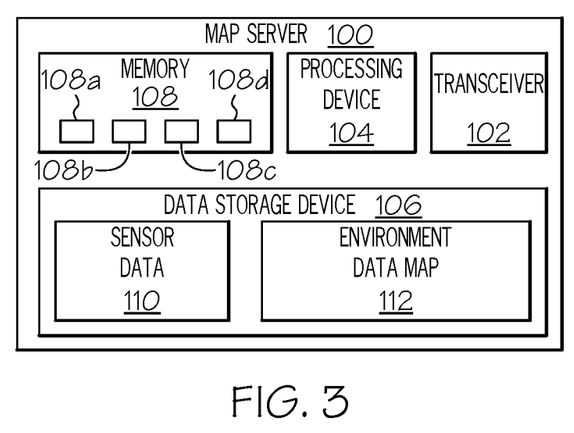
FIG. 3 schematically depicts a block diagram of illustrative components of a map server according to one or more embodiments shown or described herein.

Now referring to FIG. 3 in which various illustrative internal components of a map server 100 are schematically depicted. As described herein, the map server 100 receives sensor data from mobility devices, such as the mobility device 10 of FIG. 1, and uses that sensor data to create an environment map of particular environments (e.g., the interior of a building).

In some embodiments, the map server 100 may be located remotely from the wheelchair 10. In other embodiments, the map server 100 may be located in the vicinity of the wheelchair 10. In some embodiments, the map server 100 may be located within or near a particular environment (e.g., a building) and may create and store an environment map of that particular environment. In other embodiments, the map server 100 may create and store environment maps of a plurality of environments.

In various embodiments, the map server 100 includes a transceiver 102, a processing device 104, a data storage device 106, and a memory component 108. The processing device 104, such as a computer processing unit (CPU), may be the central processing unit of the map server 100, performing calculations and logic operations to execute a program. The processing device 104, alone or in conjunction with the other components, is an illustrative processing device, computing device, processor, or combination thereof. The processing device 104 may include any processing component configured to receive and execute instructions (such as from the memory component 108).

In some embodiments, the memory component 108 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 108 may be a non-transitory, processor-readable memory. The memory component 108 may include one or more programming instructions thereon that, when executed by the processing device 104, cause the processing device 104 to complete various processes, such as one or more of the processes described herein with respect to FIG. 4.

Still referring to FIG. 3, the programming instructions stored on the memory component 108 may be embodied as one or more software logic modules, where each logic module provides programming instructions for completing one or more tasks, as described in greater detail below. For instance, an object recognition logic module 108a may include a plurality of different pieces of logic, each of which may be embodied as a computer program, firmware, and/or software/hardware, which may be executable by the processing device 104 to recognize the presence and locations of objects within an environment. In some embodiments, the object recognition logic module 108a comprises one or more image recognition and/or machine learning algorithms. In some embodiments the object recognition logic module 108a may determine whether detected objects are moveable or non-moveable.

A dimension determination logic module 108b may include a plurality of different pieces of logic, each of which may be embodied as a computer program, firmware, and/or software/hardware, which may be executable by the processing device 104 to determine the dimensions of rooms, hallways, and other spaces within an environment. In some embodiments, the dimension determination logic module 108b comprises one or more image recognition and/or machine learning algorithms.

An accessibility point recognition logic module 108c may include a plurality of different pieces of logic, each of which may be embodied as a computer program, firmware, and/or software/hardware, which may be executable by the processing device 104 to recognize the presence and locations of points of accessibility within an environment. In some embodiments, the accessibility point recognition logic module 108c comprises one or more image recognition and/or machine learning algorithms.

In one example, a machine learning model may be trained using images of points of accessibility and other images that are not points of accessibility to train the model to recognize points of accessibility. Once the machine learning model is trained, the accessibility point recognition logic module 108c may use the trained machine learning model to detect points of accessibility. In another example, image recognition software may be programmed to recognize various points of accessibility. The accessibility point recognition logic module 108c may use the image recognition software to detect points of accessibility.

A environment map creation logic module 108d may include a plurality of different pieces of logic, each of which may be embodied as a computer program, firmware, and/or software/hardware, which may be executable by the processing device 104 to create an environment map of a particular environment.

The transceiver 102 may send and receive signals to and from a plurality of mobility devices, such as from the wheelchair 10. Thus, communication between mobility devices and the map server 100 may be provided through the transceiver 102. In particular, the transceiver 102 may receive sensor data from mobility devices and may transmit environment maps to mobility devices. In one example, mobility devices such as the wheelchair 10 may wirelessly communicate with the map server 100.

The data storage device 106, which may generally be a storage medium, may contain one or more data repositories for storing data that is received and/or generated, and may be any physical storage medium, including, but not limited to, a hard disk drive (HDD), memory, removable storage, and/or the like. While the data storage device 106 is depicted as a local device, it should be understood that the data storage device 106 may be a remote storage device, such as, for example, a server computing device or the like. Illustrative data that may be contained within the data storage device 106 is described below and includes, but is not limited to, sensor data 110 and environment map data 112.

The sensor data 110 may be data captured by sensors from one or more mobility devices, such as the sensors 26 of the wheelchair 10, when the wheelchair is in a particular environment. As mobility devices traverse through an environment, they may record sensor data relating to that environment. That sensor data may be transmitted from those mobility devices to the map server 100 and stored in the data storage device 106. In some embodiments, the data storage device 106 may store sensor data relating to a plurality of environments.

The environment map data 112 may comprise environment maps of one or more environments through which mobility device may traverse. After receiving sensor data from one or more mobility devices, the map server 100 creates or updates one or more environment maps, as explained in further detail below, and may store those environment maps in the data storage device 106. As additional sensor data is received by the map server 100 relating to one or more environments, the map server 100 may update the corresponding environment maps stored in the data storage device 106 based on the newly received sensor data.

Figure 4:
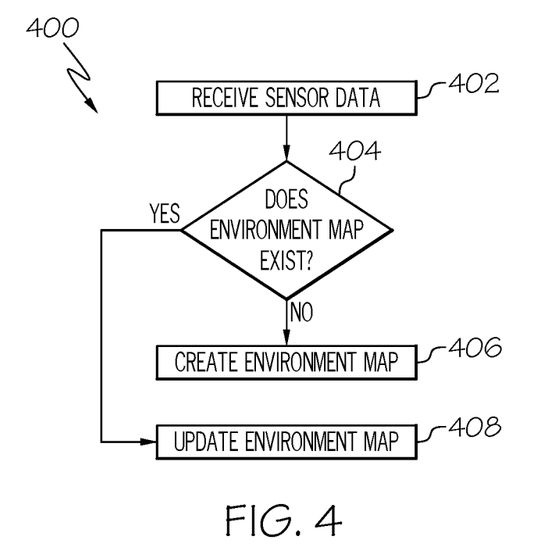
FIG. 4 depicts a flowchart of an illustrative method carried out by the map server of FIG. 3 according to one or more embodiments shown or described herein.

Now referring to FIG. 4, a flowchart of an illustrative method 400 of operation of the map server 100 of FIG. 3 is depicted. At step 402, the map server 100 receives sensor data from a mobility device, such as the wheelchair 10 of FIG. 1, through the transceiver 102. In embodiments, the map server 100 may continually receive sensor data from one or more mobility devices in one or more environments. Any mobility devices that have one or more sensors may passively collect sensor data and transmit that data to the map server 100. That is, as the mobility devices move through an environment, sensor data may be collected and transmitted to the map server 100 without the need for users of the mobility devices to affirmatively trigger the collection and transmission of sensor data. By receiving sensor data from multiple mobility devices, the map server 100 may more quickly construct environment maps.

The received sensor data may comprise a variety of information about an environment. In one example, the received sensor data may include images of a particular environment. In other examples, the received sensor data may include information about an environment determined by the wheelchair 10. This information may include the identification and/or locations of objects within the environment as determined by the object recognition logic module 72b, dimensions of various features within the environment as determined by the dimension determination logic module 72c, or the location and identification of points of accessibility within the environment as determined by the accessibility point recognition logic module 72d. The map server 100 may store the received sensor data with sensor data 110 in the data storage device 106.

Each time that the map server 100 receives sensor data, the sensor data may include metadata identifying the location of the particular environment to which the sensor data relates. This metadata may comprise, for example, a GPS location, or an address, or a building identification number assigned by the map server. At step 404, the processing device 104 of the map server 100 uses the metadata associated with received sensor data to determine whether an environment map exists for the location associated with the received sensor data.

If, in step 404, the processing device 104 determines that an environment map does not exist for the location associated with received sensor data, then, in step 406, the environment map creation logic module 108d creates an environment map for the location based on the received sensor data. If the received sensor data comprises raw data such as images, the map server 100 may analyze the raw data using one or more of the object recognition logic module 108a, the dimension determination logic module 108b, and the accessibility point recognition logic module 108c to determine objects, dimensions and points of accessibility, respectively within the environment. Once those features are determined, they can be added to an environment map by the environment map creation logic module 108d. If the received sensor data includes features of the environment as determined by the wheelchair 10, those features can be directly added to an environment map by the environment map creation logic module 108d. After the map server determines what features to include in the environment map, the environment map creation logic module 108d creates the environment with those features. The environment map may then be stored in the data storage device 106.

If, in step 404, the processing device 104 determines that an environment map does exist for the location associated with received sensor data, then, in step 408, the environment map creation logic module 108d updates the associated environment map stored in the data storage device 106 by adding the newly identified features or modifying existing features based on the sensor data. The updated map may then be stored in the data storage device 106.

The environment map creation logic module 108d can create environment maps having a variety of features including, among other things, dimensions of rooms and hallways, the location of objects within the environment, the identification of whether or not the objects are moveable, and the identification of points of accessibility. The environment maps created by and stored on the map server 100 can then be utilized by autonomous wheelchairs to navigate through the environments described by the maps, as explained in further detail below. The environment maps stored on the map server 100 may also be accessed by third parties, such as first responders. First responders may use the environment maps to navigate through an environment in emergencies.

Figure 5:
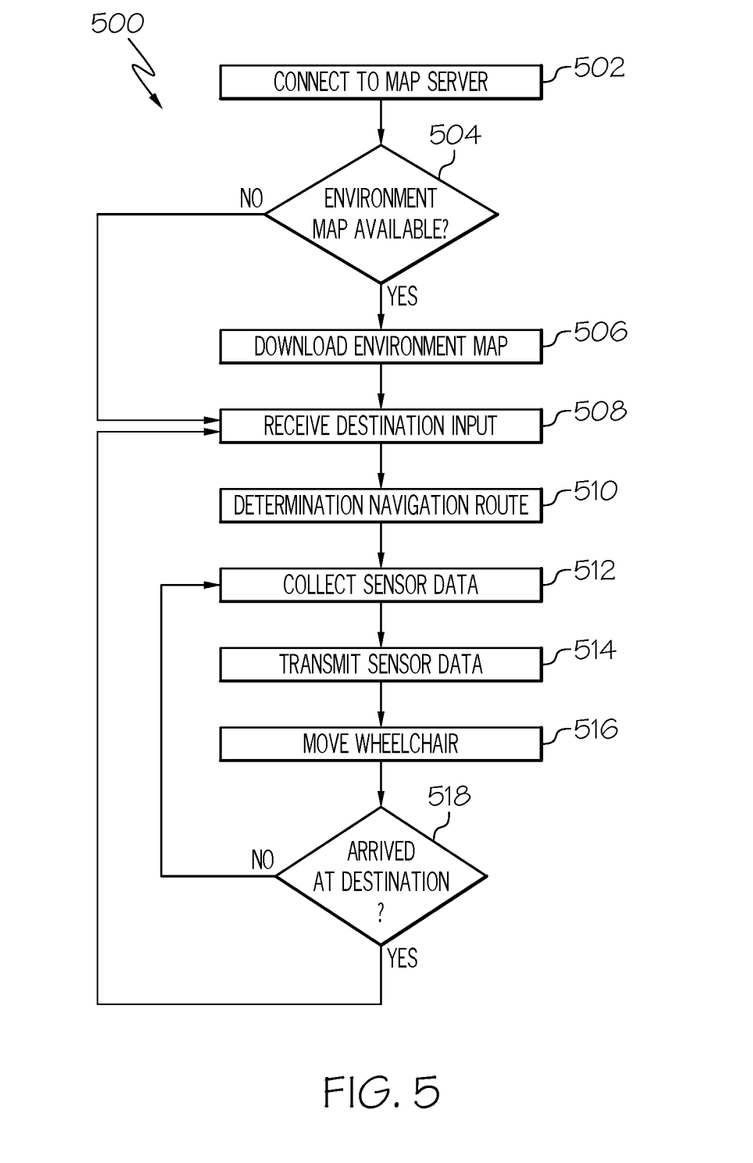
FIG. 5 depicts a flowchart of an illustrative method carried out by the mobility device of FIGS. 1-2 according to one or more embodiments shown and described herein.

Now referring to FIG. 5, a flowchart of an illustrative method 500 of operation of the autonomous wheelchair 10 of FIGS. 1-2 is depicted. At step 502, the wheelchair 10 establishes a connection to the map server 100. In some embodiments, the wheelchair 10 may connect to the map server 100 via the network 74. In other embodiments, the wheelchair 10 may connect to the map server 100 via the transceiver 38. In some embodiments, the connection to the map server 100 may be initiated by the user 12 inputting an appropriate command on the touch screen 22 (e.g., tapping a particular icon).

Once the wheelchair 10 has established a connection to the map server 100, the wheelchair 10 transmits a request to the map server 100 for an environment map. The request for the environment map may include a GPS location of the wheelchair or other information to identify the specific environment for which an environment map is being requested. In some embodiments, the request for an environment map may be initiated by the user 12 inputting an appropriate command on the touch screen 22. For example, when the user 12 of the wheelchair 10 approaches or enters a building, the user 12 may tap an icon on the touch screen 22 to request an environment map for the building.

After the wheelchair 10 transmits a request for an environment map to the map server 100, the map server determines whether an environment map exists for the particular requested environment at step 504. If the particular environment map exists, the map server 100 transmits the environment map to the wheelchair 10 at step 506. The received environment map may be stored in the environment map data 78 of the data storage device 70. If the particular environment map does not exist, control passes to step 508.

At step 508, the user 12 inputs into the touch screen 22 a desired destination where they would like the autonomous wheelchair 10 to move. For example, the user 12 may enter a particular room in the building where they would like to go. In some embodiments, the environment map is displayed on the touch screen 22 and the user 12 taps the location on the environment map where they would like to go. In other embodiments, other methods of inputting a desired destination may be used (e.g., voice commands).

After a desired destination is input, the navigation unit 36 of the wheelchair 10 determines a navigation route from the wheelchair's current position to the desired location at step 510. If an environment map is available, the navigation route is based on the environment map. The navigation unit 36 may determine a navigation route that is best suited for the wheelchair 10. That is, the determined route may avoid hallways that are too narrow for the wheelchair 10, may be planned around objects that are not moveable, and may include points of accessibility if they are needed to, for example, enter rooms or move between floors. If an environment map is not available, a direct route to the desired destination can be planned, which can be updated based on sensor data, as explained below.

At step 512, the sensors 26 activate to collect sensor data around the wheelchair 10. This sensor data may be used alone or in combination with an environment map to navigate the wheelchair 10 through the environment. That is, as the wheelchair 10 moves through the environment, the sensors 26 may continually gather updated information about the environment. As such, the wheelchair 10 may make decisions such as avoiding objects and turning around corners as needed to reach the desired destination.

At step 514, the sensor data gathered by the sensors 26 is transmitted to the map server 100. This allows the map server 100 to continually update the environment map as explained above in connection with FIG. 4. The sensor data gathered by the sensors 26 may include metadata that identifies the location of the environment to which the sensor data relates. In some embodiments, the sensor data gathered by the sensors 26 may not be transmitted to the map server 100 as it is gathered, but instead may be saved as sensor data 76 in the data storage device 70 and transmitted at a later time in bulk, or in some examples, not transmitted at all.

At step 516, the processing device 68 may actuate the wheels 28 and the motor 30 to cause the wheelchair 10 to move based on the gathered sensor data and the determined navigation route. The processing device 68 may utilize the wheelchair movement logic module 72a to coordinate movement of the wheels 28 and actuation of the motor 30.

After the wheelchair 10 moves a certain distance, the processing device 68 determines whether the wheelchair has reached the desired destination at step 518. If the destination has not been reached, then control passes back to step 512 and additional sensor data is gathered. The wheelchair 10 can then continue to be moved based on the new sensor data and the determined navigation route. That is, as the wheelchair 10 moves through the environment, the sensors 26 continually gather sensor data and the movement of the wheelchair 10 may be adjusted as new sensor data is gathered. In some examples, a new navigation route may be determined if the sensor data shows that the current navigation route is not possible to follow (e.g., if the wheelchair 10 encounters an unexpected obstruction in its path). Once the desired destination is reached, control returns to step 508 and a new destination is awaited to be input by the user 12.

It should now be understood that embodiments of the present disclosure are directed to mapping and data collection of in-building layout via mobility devices. Accordingly, the systems described herein allow for a map server to receive sensor data from a plurality of mobility devices relating to an environment and construct an environment map based on the received data. Embodiments described herein also allow for autonomous mobility devices to navigate through an environment based on such environment maps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving sensor data relating to an environment from a plurality of mobility devices;
   determining locations of one or more ramps or elevators within the environment based on the sensor data;
   determining dimensions of one or more passageways within the environment based on the sensor data;
   creating an environment map based on the sensor data;
   transmitting the environment map to a mobility device;
   determining whether an environment map exists for the environment; and
   upon determination that the environment map exists for the environment, updating the environment map based on the sensor data;
   wherein the environment map includes the one or more ramps or elevators.

2. The method of claim 1, further comprising:
   determining locations of one or more objects within the environment based on the sensor data.

3. The method of claim 2, further comprising determining whether each of the one or more objects within the environment is moveable based on the sensor data.

4. A map server comprising:
   a transceiver to receive sensor data relating to an environment from a plurality of mobility devices;
   a processing device; and
   a non-transitory, processor-readable storage medium in communication with the processing device, wherein the non-transitory, processor-readable storage medium comprises one or more programming instructions that, when executed, cause the processing device to:
   determine locations of one or more ramps or elevators within the environment based on the sensor data;
   determine dimensions of one or more passageways within the environment based on the sensor data;
   create an environment map of the environment based on the sensor data, wherein the environment map comprises the locations of one or more ramps or elevators within the environment;
   determine whether an environment map exists for the environment; and
   upon determination that the environment map exists for the environment, update the environment map based on the sensor data.

5. The map server of claim 4, wherein the programming instructions comprise an object recognition logic module to determine the presence and location of objects within the environment based on the sensor data.

6. The map server of claim 5, wherein the object recognition logic module determines whether the objects within the environment are moveable based on the sensor data.

7. The map server of claim 4, wherein the programming instructions comprise an accessibility point recognition logic module to determine the presence and location of one or more points of accessibility within the environment.

8. The map server of claim 4, wherein the map server further comprises a data storage device to store environment maps of one or more environments.

9. An autonomously driven mobility device comprising:
one or more sensors to collect sensor data about an environment;
a transceiver to transmit the sensor data to a map server and receive an environment map of the environment from the map server;
a data storage device to store the environment map of the environment comprising locations of one or more ramps or elevators within the environment;
a navigation unit to determine a navigation route between a current position of the mobility device and a selected destination in the environment based on the environment map;
a processing device; and
a non-transitory, processor-readable storage medium in communication with the processing device, wherein the non-transitory, processor-readable storage medium comprises one or more programming instructions that, when executed, cause the processing device to:
determine dimensions of one or more passageways within the environment based on the sensor data;
determine whether an environment map exists for the environment;
upon determination that the environment map exists for the environment update the environment map based on the sensor data; and
cause the mobility device to move towards the selected destination along the navigation route.

10. The mobility device of claim 9, wherein the mobility device comprises a wheelchair.

11. The mobility device of claim 9, wherein the programming instructions cause the processing device to adjust the movement of the mobility device based on the sensor data.

12. The mobility device of claim 9, further comprising:
a motor; and
a plurality of wheels;
wherein the programming instructions comprise a wheelchair movement logic module to coordinate movement of the wheels and actuation of the motor.

13. The mobility device of claim 9, wherein the programming instructions comprise an object recognition logic module to determine the presence and location of objects within the environment based on the sensor data.

14. The mobility device of claim 13, wherein the object recognition logic module determines whether the objects within the environment are moveable.

15. The mobility device of claim 9, wherein the programming instructions comprise a dimension determination logic module to determine dimensions of one or more rooms or passageways within the environment based on the sensor data.

16. The mobility device of claim 9, wherein the programming instructions comprise an accessibility point recognition logic module to determine the presence and location of one or more points of accessibility within the environment.

* * * * *

UNITED STATES PATENT AND TRADEMARK OFFICE
CERTIFICATE OF CORRECTION

PATENT NO. : 11,642,257 B2
APPLICATION NO. : 16/749222
DATED : May 9, 2023
INVENTOR(S) : Stephen Paul McFarland It is certified that error appears in the above-identified patent and that said Letters Patent is hereby corrected as shown below:

On the Title Page

Column 2, item (56), U.S. Patent Documents, cite No. 2, delete "Saboo" and insert --Saboo et al.--, therefor.

In page 2, Column 1, item (56), U.S. Patent Documents, cite No. 7, delete "Hackert" and insert --Hackert et al.--, therefor.

In page 2, Column 1, item (56), U.S. Patent Documents, cite No. 9, delete "Tokuhashi" and insert --Tokuhashi et al.--, therefor.

Signed and Sealed this
Twenty-seventh Day of June, 2023

Katherine Kelly Vidal
*Director of the United States Patent and Trademark Office*